Sept. 14, 1965 L. M. FETTERMAN 3,206,077
APPARATUS FOR STORING VISCOUS MATERIALS
Filed April 6, 1962 2 Sheets-Sheet 1
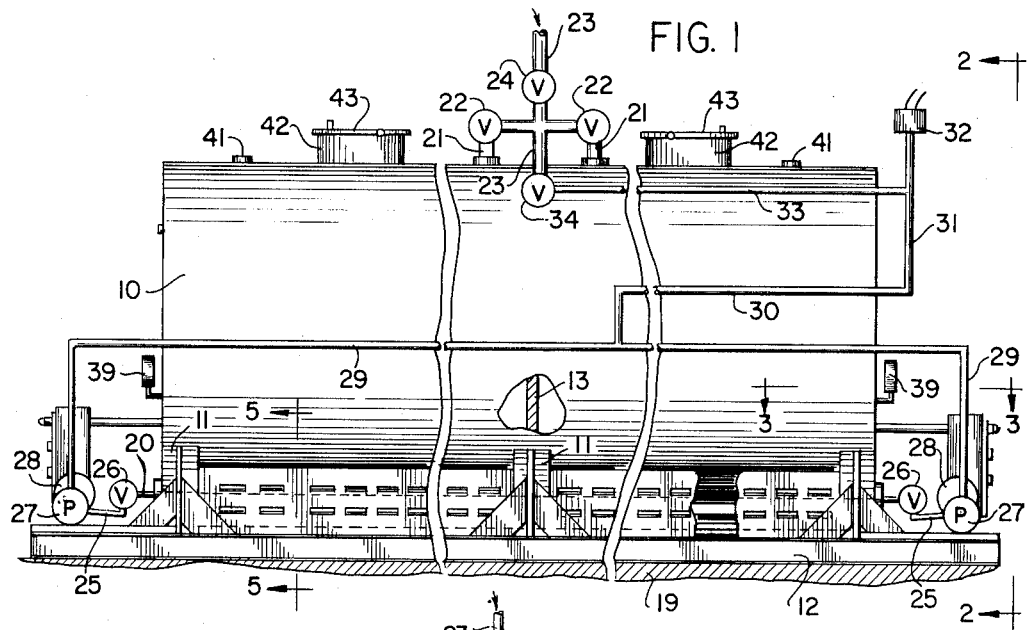
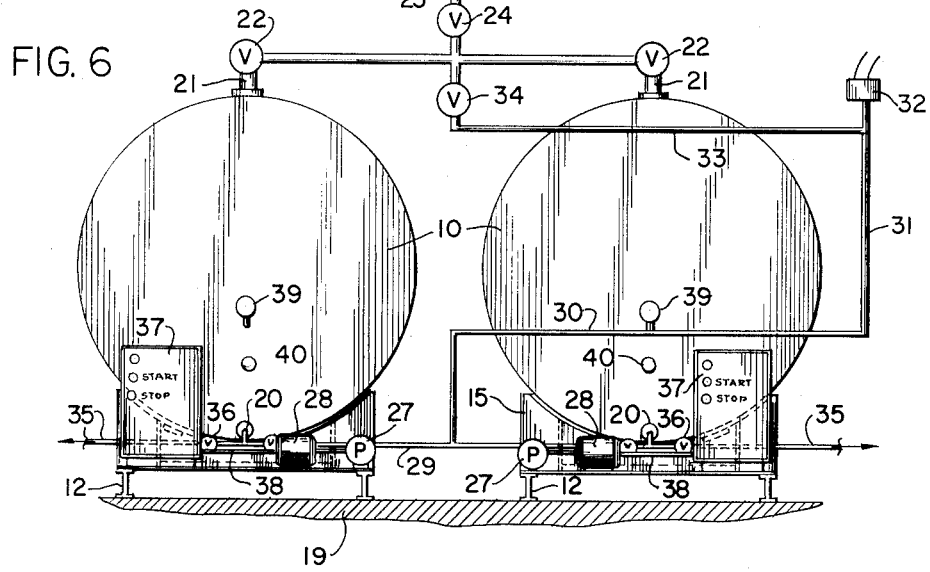
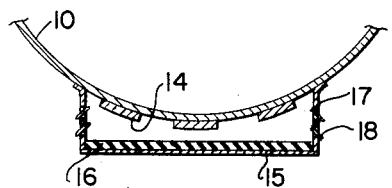
INVENTOR
LEWIS M. FETTERMAN
BY *Ayates Dowell III*
ATTORNEYS Sept. 14, 1965 L. M. FETTERMAN 3,206,077
APPARATUS FOR STORING VISCOUS MATERIALS
Filed April 6, 1962 2 Sheets-Sheet 2

INVENTOR
LEWIS M. FETTERMAN

BY *A. Yates Dowell*
ATTORNEY

3,206,077
APPARATUS FOR STORING VISCOUS MATERIALS

Lewis M. Fetterman, Clinton, N.C., assignor, by mesne assignments, to The Lundy Sales Corporation, New York, N.Y., a corporation of New York
Filed Apr. 6, 1962, Ser. No. 185,558
9 Claims. (Cl. 222—135)

This invention relates to apparatus and equipment by which substances which are liquid or flowable at certain temperatures and pasty or solid and consequently unflowable at other temperatures are handled and utilized in various processes and the temperature of which it is necessary to modify to obtain certain conditions.

The invention relates particularly to the use of melted and clarified fat of swine, generally known as lard, to the maintenance at a temperature to retain its liquid state, and to the storage and delivery for use by bakeries, as well as the measuring and dispensing thereof and to equipment by which the above results are accomplished.

It has been customary to deliver lard to bakeries in containers such as drums or the like and from which the lard in a solid or pasty condition is removed as needed for use. This requires a relatively large storage area, it involves spillage and loss of lard in emptying the drums and presents a problem in cleaning the drums and difficulty in maintaining and preserving sanitation and avoiding contamination of the lard. Also, it makes it necessary that the drums be used in the order of receipt in order that the oldest lard be used to avoid becoming rancid or spoiled, all of which involves substantial labor, time and consequent expense.

It is the object of the invention to overcome the difficulties enumerated and to provide apparatus for the maintenance of lard in liquid condition, to provide means for storing, circulating, measuring and dispensing the same and with such measuring equipment of such character that not only can the total quantity of the lard dispensed be determined, but a predetermined quantity can be measured for mixing with other substances.

Figure 2:
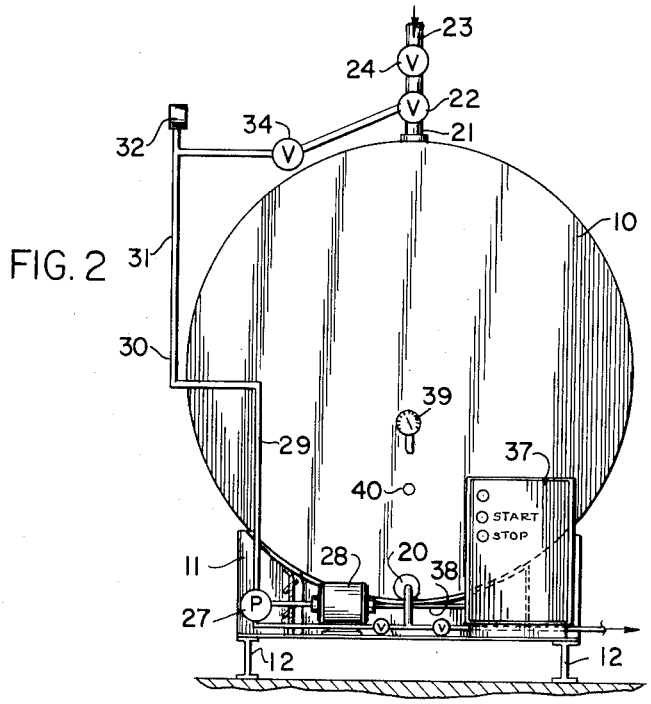
Figure 3:
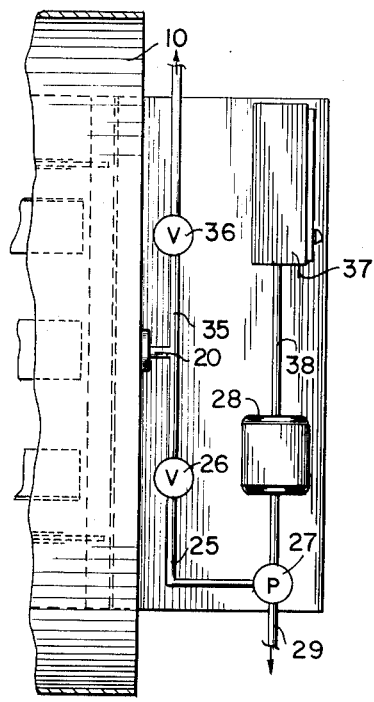
Figure 4:
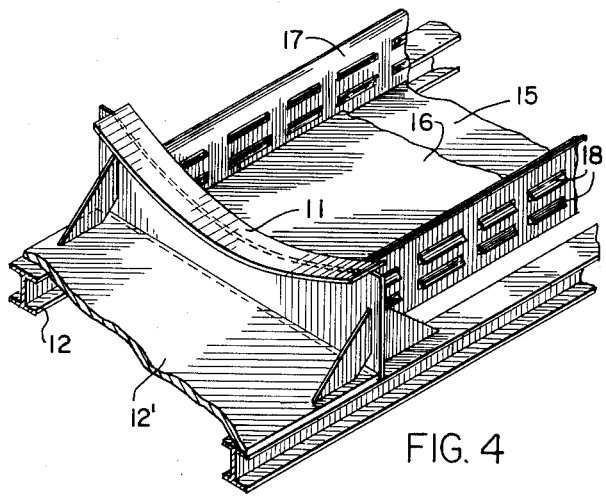

Other objects and advantages of the invention will be apparent from the following description taken in conjunction with the accompanying drawings in which:

FIG. 1 is a side elevation of a lard system in accordance with the present invention;

FIG. 2, an end elevation on the line 2—2 of FIG. 1;

FIG. 3, a fragmentary horizontal section on the line 3—3 of FIG. 1;

FIG. 4, an enlarged fragmentary detail perspective;

FIG. 5, a vertical section on the line 5—5 of FIG. 1;

FIG. 6, an end elevation of a multiple form of the invention; and

Figure 7:
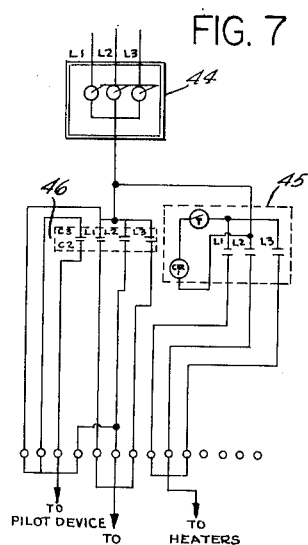

FIG. 7, an electrical wiring diagram.

Briefly stated the invention is an apparatus or system by which lard is kept at a temperature to maintain it in a liquid state and includes a tank with electrical heating elements in good heat exchange relation with the exterior thereof and controlled by a thermostat. The system also includes piping, a circulating pump with a three-way valve and a metering device to indicate the gross amount of lard that has passed through it and to enable a predetermined amount of lard to be dispensed for a particular purpose, thereby facilitating the receiving, handling, storage and dispensing of lard under improved conditions with minimum loss occurring from the emptying of drums and spillage, as well as resulting in a smaller lard storage area, the simplified cleaning thereof, and the reduction of the likelihood of contamination.

With continued reference to the drawings the present invention is a unitary structure including a tank 10 of stainless steel or other suitable material, or at least having the inside or containing surface of such material, such tank being supported by saddle members 11 of which there are at least three mounted on I-beams or structural members 12. The central saddle member is slightly taller than the other two at the ends of the tank to cause the gravity flow of material in the tank towards the ends thereof to facilitate the emptying of the tank.

The tank 10 preferably is provided with a central transverse partition 13 for dividing the tank into compartments so that the contents of one compartment may be used while another is being cleaned and filled.

In order to maintain a desired temperature in each of the compartments of the tank, heating means may be employed such as for example electrical heating elements 14 disposed in contact or good heat exchange relation with the exterior of the tank and along the wall of each compartment or the end portions of the tank in order to selectively heat one or both of the compartments.

A housing 15 may be provided for the heating elements and for insulation 16, the housing having side portions 17 and being of substantially inverted U-shape with vents or louvers 18 in each. The unitary structure including the I-beams or structural elements 12 may rest upon a base or foundation 19.

The tank 10 is provided with a discharge outlet 20 from each compartment and a filling inlet 21 subject to a control valve 22 from a supply line 23. The supply line 23 likewise is controlled by a stop valve 24. When the valve 24 is open the supply may pass to the valves 22, and if such valves are open, the supply may pass through the filling inlet 21 into the respective partitions of the tank. From the outlet 20 at the lower portion of the tank a line 25, controlled by a valve 26, is connected to an operating pump 27 driven by a motor 28 by means of which lard is forced through lines 29, 30 and 31 to a meter control valve 32.

If the meter control valve is open, lard will be dispensed but if such meter control valve is closed, the lard will be bypassed through the line 33 and a shutoff valve 34 to the lower end of the supply line 23 and to either of valves 22 and therefore is returned to the tank from which it was drawn. The meter control valve indicates the gross amount of lard that has passed through and likewise can be set to dispense a predetermined amount of lard. The details of the meter control valve 32 form no part of the instant invention and may be of any desired type, such for example as shown in United States Patent 1,759,396.

In order to provide for the drainage of the compartments, a line 35 is provided having a shutoff valve 36. In order to accommodate the electrical mechanism, a control panel 37 is provided mounted on a floor 12' on the I-beams 12 and having electrical conduits 38 for supplying electrical energy to the motor 28. The tank may be provided with a gauge 39 for indicating the temperature of the lard within each of the compartments of the tank and a thermostat 40 may be provided for controlling the temperature of the contents of the tank. Each compartment of the tank may be provided with a vent 41, and a cleaning outlet 42 with a cover 43.

Referring now to FIG. 7 of the drawing, a three-pole circuit breaker 44 is provided to receive outside electrical power from any desired source; for instance, a junction box or terminal block (not shown). On the load side of said circuit breaker, current is split into two paths, one path travelling through a contactor element 45 (indicated by dotted lines) embodying a thermostat 40 (FIG. 2) and an optical temperature reading gauge 39 and proceeding to the heating elements 14. The second current path is directed to a magnetic starter 46 (indicated by dotted lines) which is capable of supplying sufficient power to start and run the pump motor 28. A pilot light or other indicating means (not shown) is tapped off of the starter and remains lit during the operation of the starter and hence the pump motor. Therefore, operation of the heating elements 14 is governed by thermostat 40 while operation of the pump motor and pilot light is governed by any convenient switch means (not shown) connected to the magnetic starter 46.

It will be apparent from the foregoing that a unitary structure or system is provided by means of which lard may be contained and may be heated in the compartment to be used, from whence it can be taken by a motor driven pump and circulated or forced to a place of use through a metered valve, or if desired it can be directed back into the tank from which it was drawn thereby being thoroughly agitated. Also it is possible to use the contents of one of the compartments while another compartment is being drained, cleaned and refilled, and that as a result the receiving, handling, storage and dispensing of lard or other commodity is facilitated with minimum loss due to consistency of the lard or the like adhering to the walls of drums or other containers reduces the area required, simplifies cleaning, promotes sanitation, and avoids likelihood of contamination.

Instead of a tank with multiple compartments as illustrated in FIG. 1, two or more tanks may be employed as illustrated in FIG. 6 in which event the tanks will have their discharge ends lower than their other ends; otherwise the structure is the same.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A unit for the handling of lard comprising structural elements in the form of I-beams, saddle supports carried on said I-beams, a tank having a central partition providing compartments at each end of said tank on said saddle, electrical heating elements in heat exchange relation with a wall of said tank, thermostatic means for controlling the temperature of said electrical heating elements and the contents of the tank, an inverted generally U-shaped housing for said heating elements, said housing having louvered sides, a supply line extending to each compartment of said tank, a shutoff valve in said supply line, a shutoff valve controlling the inlet to each tank, whereby said tanks may be filled selectively, a discharge from the lower portion of each of the compartments of said tank, a valve controlling said discharge, a motor operated circulating pump, a line extending from said pump to a meter control valve, and a line for by-passing the flow of lard when the meter control valve is closed.

2. Apparatus for containing and dispensing lard or the like comprising a unit including a tank having an inlet for admitting lard thereto, means for maintaining a constant temperature in said tank for keeping the lard in liquid condition, a discharge from said tank, a meter control valve in said discharge, a pump for producing flow within said tank and for forcing lard in liquid state from said tank through said meter control valve, a by-pass from said discharge intermediate said tank and said meter control valve and connected with said inlet through which lard can be circulated through said discharge and returned to the tank for producing thorough equalization of heat within the tank and relieving the pressure to said meter control valve when material is not being discharged from the tank.

3. Unitary apparatus of the character described for storing, maintaining temperature, circulating, measuring, and dispensing, matter such as lard which is in a pasty or solid state at one temperature and liquid at another temperature comprising supporting means, container means having walls providing one or more compartments, heating means for and adjacent to at least one wall of each of said compartments, means connected to said heating means for controlling the temperature produced in said compartments, means for supplying matter having the general characteristics of lard to said compartments, control means controlling the supply of such matter for said supply, means in communication with the interior of said compartments for agitating and producing circulation of matter in and the discharge from said compartments, means for by-passing said discharge and returning the matter circulated to said compartments, and means for measuring the quantity of matter discharged.

4. A unit for handling lard comprising multiple tank compartments, heating means operatively associated with said tank compartments for supplying heat to the contents thereof, means to control the heat supply and temperature of the contents of the compartments, supply and discharge lines to and from said compartments, control means whereby said compartments may be filled selectively, means for producing forced movement of lard within and for discharging lard from said compartments, and by-pass means for returning lard entering said discharge lines to said compartments.

5. A unit for the handling of lard comprising multiple tank compartments, heating means associated with said compartments for supplying heat to the contents thereof, means whereby the heat supplied by said heating means may be controlled to control the temperature of the contents of the compartments, supply and discharge lines to and from said compartments, controls operatively associated with said supply and discharge lines whereby said compartments may be filled and emptied selectively, means for producing forced movement of lard through said discharge lines to a place of discharge and for bypassing lard around the same and back to the compartments when the lard is not being discharged at the place of discharge.

6. A unit for the handling of lard comprising tank compartments, means for supplying heat in a manner to raise the temperature of the contents of said compartments, thermostatic means for controlling the heat supplied whereby the temperature of the contents of the tank also may be controlled, supply and discharge lines, valve means in said lines whereby said compartments may be filled selectively, a cutoff valve, a circulating pump in the discharge line outwardly of said cutoff valve, a metering valve, a second line extending from the pump to said metering valve, and a bypass line for returning the lard to the tank when the metering valve is closed.

7. Unitary apparatus of the character indicated for storing, maintaining at a controlled temperature, circulating, merging, and dispensing matter such as lard which has the characteristic of being in a pasty or solid state at one temperature and in a liquid state at another temperature, comprising a generally cylindrical container having a partition providing multiple compartments, heating means for at least a portion of the wall of each of said compartments, means for controlling said heating means, means for supplying matter having the general characteristics of lard to said compartments, control means for said last mentioned means, means for producing circulation of matter in said compartments, means for discharging said matter from said compartments, and means for measuring the quantity of matter discharged.

8. The structure of claim 7 and bypass means for returning matter about to be discharged to said compartments.

9. Lard containing and dispensing apparatus comprising tank means,
  inlet means for admitting lard to said tank means,
  temperature modifying and controlling means operatively associated with said tank means for maintaining a constant temperature in said tank means such that the lard therein will be maintained in a liquid state,
  discharge means connected to said tank means for discharging lard therefrom,
  pump means connected to said discharge means for forcing lard through said discharge means,
  and bypass means connecting said discharge means with said inlet means through which lard can be diverted from said discharge means and returned to said tank means thereby producing sufficient movement of lard within said tank means to cause the distribution of heat through the contents therein and keep the lard from solidifying and obstructing said discharge means.

References Cited by the Examiner

UNITED STATES PATENTS

| | | | |
|---|---|---|---|
| 1,104,633 | 7/14 | Cressy | 222—146 X |
| 1,633,458 | 6/27 | Shock | 222—396 X |
| 1,705,649 | 3/29 | Scott | 222—146 X |
| 1,909,733 | 5/33 | Thwaits | 222—145 |
| 2,378,184 | 6/45 | Carlson | 222—318 X |
| 2,440,406 | 4/48 | Kerr | 222—146 X |
| 2,461,766 | 2/49 | Peeps | 222—318 X |
| 2,506,412 | 5/50 | Chausse | 222—318 X |
| 2,626,785 | 1/53 | Lewis et al. | 222—129.4 X |
| 2,629,885 | 3/53 | Taylor | 222—146 X |
| 2,693,196 | 11/54 | Hundley | 222—318 X |
| 2,802,601 | 8/57 | Berry | 222—146 X |
| 2,996,222 | 8/61 | Botkin | 222—67 |

RAPHAEL M. LUPO, *Primary Examiner.*

LOUIS J. DEMBO, HADD S. LANE, *Examiners.*